Sept. 4, 1928.  E. P. BUCKLEY  1,683,523
VALVE MECHANISM
Filed Feb. 1, 1927
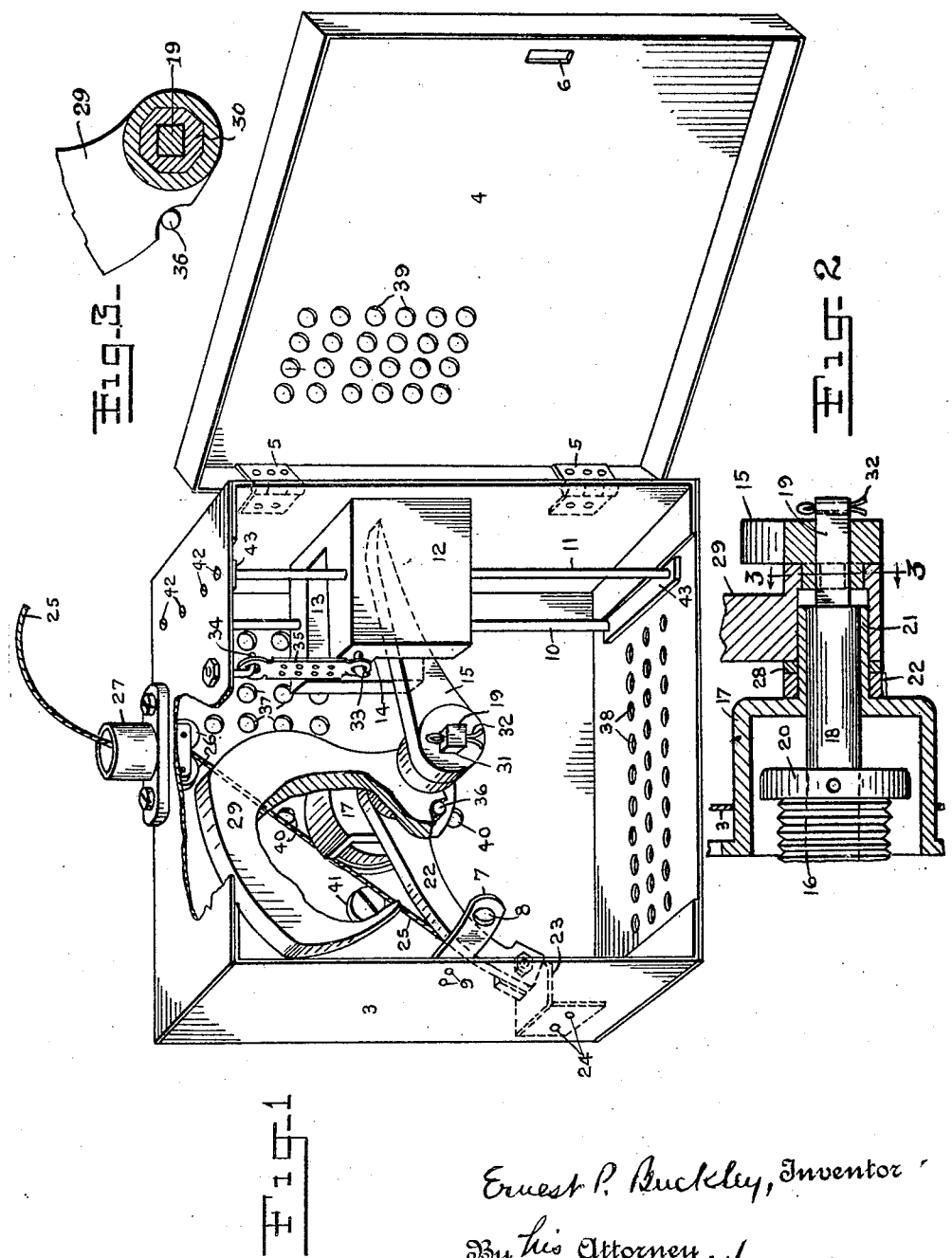
Ernest P. Buckley, Inventor
By his Attorney Patented Sept. 4, 1928.

1,683,523

UNITED STATES PATENT OFFICE.

ERNEST P. BUCKLEY, OF NEW YORK, N. Y., ASSIGNOR, BY MESNE ASSIGNMENTS, TO PERMEX CORPORATION OF AMERICA, A CORPORATION OF NEW JERSEY.

VALVE MECHANISM.

Application filed February 1, 1927. Serial No. 165,116.

My invention relates to improvements in cut-off mechanism for valves and the like, and more particularly is adapted, and is illustrated in the accompanying drawings in its application to a main gas valve for automatically turning off the same at a predetermined temperature, also providing manual means of operation for turning off the valve independently of said automatic means.

Referring to said drawings, Fig. 1 illustrates in perspective, parts being broken away, a suitable form of mechanism embodying an application of my invention, Fig. 2 is an enlarged detail of the bearings, partly in longitudinal section, and parts broken away, and Fig. 3 is section on the line 3—3 of Fig. 2.

3 indicates a suitable metallic box such as of pressed galvanized steel, and 4 the cover therefor suitably hinged as indicated at 5, and having a hole 6 to pass over the lug 7, having a hole 8 therein for a padlock or other suitable fastening means, said lug being suitably secured to the box, as by rivets 9. 10, 11, indicate a pair of vertically retained rods upon which a weight 12, having holes through which said rods pass, may slide vertically, said weight being cutaway in the center as indicated at 13 and having a ledge 14, against which the lever 15 bears.

The valve (not shown) is secured at the back of the box, and may be of any suitable form, the inwardly projecting end being indicated by the reference character 16, and of the housing of the valve, a protruding portion 17 extends within the box, providing a bearing for the round portion 18 of a shaft or spindle, which also has a rectangular end 19, said round portion 18 passing through the bearing 20, and through the casing of the valve to the moving part thereof (not shown), so as to rotate or oscillate the same. 21 indicates a sleeve or bearing protruding inwardly from the casing portion or housing 17, and through which the round portion 18 of the shaft passes as shown. 22 indicates a lever which normally rests upon the bracket 23, secured to the box as shown at 24, and having at its free end, suitably secured, a cable 25 which passes upwardly between the rollers 26, and through the outlet 27, serving as a hand pull to operate the valve. 28 indicates a washer or separating ring, also upon the bearing 21, which separates the lever 22 from the weight 29, also mounted thereon as shown, the right end, looking at Fig. 2, of the hole in the weight 29 being preferably octagonal or flat sided to receive and engage a similarly formed projection 30 of the lever 15, which passes thereinto as shown in Fig. 2, said lever having a rectangular hole 31 to receive the square end 19 of said shaft, and 32 indicates suitable fastening means such as a cotter pin for securing the combination in position. It will be noted that by reason of the mounting of the weight 29 on the bearing portion 21 of the housing 17 the valve spindle is relieved of the burden of carrying said weight and is not subjected to the likelihood of strains that might be caused if the weight were carried thereby instead of by the bearing 21 as shown. When mounted substantially as shown in Fig. 1, the weight 12 is preferably suspended as shown, and for this purpose is provided with a hook 33, a similar hook being also provided at 34, secured to the top of the box, said hooks being connected by a link 35 of fusible material so that when said link fuses, the weight 12 drops by gravity, and in so doing, the free end of the lever 15 is depressed, thereby rotating the shaft 18, 19 and moving the valve toward closed position and, at the same time the octagonal end 30 of the lever 15 engages and turns the weighted member 29, throwing the same rightwardly over the dead center, thereby completing the closing of the valve, and holding the same closed until the parts are restored to their original position.

Independently of the operation of the valve by the weight 12, when the link 35 is fused, by pulling down the cable 25, the lever 22 is lifted, and this lever is provided with a pin 36 which engages beneath the weighted member 29, thereby throwing the same over the dead center in the same manner as when the weight 12 operates the same, thus providing both automatic and manual operation of the valve.

The link 35 is formed of the usual fusible material to fuse at a predetermined temperature, so that for instance, in case of fire, the gas is automatically cut off at the main when a dangerous degree of temperature has been reached, or may be manually cut off, as aforesaid, if desired.

The perforations 37, 38, and 39, may be suitably distributed substantially as shown, to facilitate a proper circulation of air through the box, as a further insurance of proper automatic operation of the valve, and suitable holes, such as 40, may be provided for screws or bolts such as 41, so that the valve may be attached in any suitable position. 42 indicates screws which may be passed through the box, and retaining strips such as 43 for holding the rods 10, 11, in position, or any other suitable fastening means may be provided. In fact, various modifications may be made in the construction and arrangement of parts without departing from the spirit of the invention as claimed.

The present invention is claimed more broadly in the application of Tilman White, Serial Number, 718,165, filed June 5, 1924.

I claim:—

1. In valve operating mechanism of the class described, a valve spindle, a weight normally supported at one side of the center of said spindle for holding the valve open, another weight normally retained against gravity by a fusible link and adapted when said link is fused to throw said first mentioned weight over the center of said spindle, whereby said valve is closed and the first mentioned weight retains said valve in closed position, said second mentioned weight mounted independently of said spindle.

2. In valve operating mechanism of the class described, a valve spindle, a weight normally supported at one side of the center of said spindle for holding the valve open, another weight normally retained against gravity by a fusible link and adapted when said link is fused to throw said first mentioned weight over the center of said spindle, whereby said valve is closed and the first mentioned weight retains said valve in closed position, and a lever connected to said spindle adapted to be operated by the falling of said second mentioned weight, said second mentioned weight mounted independently of said spindle.

3. In valve operating mechanism of the class described, a valve spindle, a weight normally supported at one side of the center of said spindle for holding the valve open, another weight mounted independently of said spindle normally retained against gravity by a fusible link and adapted when said link is fused to throw said first mentioned weight over the center of said spindle, whereby said valve is closed and the first mentioned weight retains said valve in closed position, and a lever connected to said spindle adapted to be operated by the falling of said second mentioned weight, and in combination, a second lever and manual means for operating the same, for operating said valve independently of the second mentioned weight.

4. In a valve operating mechanism of the class described, a valve housing comprising a bearing portion, a valve spindle mounted in said bearing portion a weight mounted on said bearing portion and operatively connected to said spindle, and means operatively connected to said valve spindle for operating the valve.

In testimony whereof I hereunto affix my signature.

ERNEST P. BUCKLEY.